(12) United States Patent
Goeke et al.

(10) Patent No.: US 8,387,400 B2
(45) Date of Patent: Mar. 5, 2013

(54) THERMAL MANAGEMENT FOR FUEL INJECTORS

(75) Inventors: Jerry Lee Goeke, West Des Moines, IA (US); Neal A. Thomson, West Des Moines, IA (US); Brandon Phillip Williams, Urbandale, IA (US)

(73) Assignee: Delavan Inc, West Des Moines, IA (US)

( * ) Notice: Subject to any disclaimer, the term of this patent is extended or adjusted under 35 U.S.C. 154(b) by 0 days.

(21) Appl. No.: 13/348,682

(22) Filed: Jan. 12, 2012

(65) Prior Publication Data
US 2012/0117972 A1 May 17, 2012

Related U.S. Application Data

(62) Division of application No. 12/268,511, filed on Nov. 11, 2008, now Pat. No. 8,141,368.

(51) Int. Cl.
*F02C 1/00* (2006.01)
(52) U.S. Cl. .................. 60/772; 60/39.281; 60/748
(58) Field of Classification Search .............. 60/39.281, 60/734, 740, 742, 748, 772; 239/132.3, 132.5
See application file for complete search history.

(56) References Cited

U.S. PATENT DOCUMENTS

| | | | |
|---|---|---|---|
| 3,685,920 A | 8/1972 | Burge | |
| 5,570,580 A | 11/1996 | Mains | |
| 6,094,904 A | 8/2000 | Goodrich et al. | |
| 6,199,368 B1 | 3/2001 | Onoda et al. | |
| 6,729,135 B1 | 5/2004 | Norris et al. | |
| 6,761,032 B2 * | 7/2004 | Moser | 60/773 |
| 7,377,112 B2 | 5/2008 | Spadaccini et al. | |
| 7,823,388 B2 * | 11/2010 | Murakami | 60/773 |
| 2006/0005526 A1 | 1/2006 | Tanaka et al. | |
| 2007/0119147 A1 | 5/2007 | Cornwell et al. | |
| 2007/0151252 A1 | 7/2007 | Cornwell et al. | |
| 2007/0163263 A1 | 7/2007 | Thomson | |
| 2009/0170043 A1 | 7/2009 | Nilsson et al. | |
| 2009/0271085 A1 | 10/2009 | Buchalter et al. | |

FOREIGN PATENT DOCUMENTS

| | | |
|---|---|---|
| EP | 0527629 | 2/1993 |
| JP | 58217726 A | 12/1983 |
| JP | 61250412 | 4/1985 |

OTHER PUBLICATIONS

Bahr, E.V., Technology for the Design of High Temperature Rise Combustors, vol. 3 No. 2., Mar.-Apr. 1987, pp. 179-186.

(Continued)

*Primary Examiner* — Phutthiwat Wongwian
(74) *Attorney, Agent, or Firm* — Edwards Wildman Palmer LLP; Scott D. Wofsy (57) ABSTRACT

Methods of managing fuel temperatures in fuel injectors for gas turbine engines include cooling fuel circuits by initiating fuel flow therethrough using opened, closed, and semi-open control techniques. A fuel injector for a gas turbine engine includes a feed arm having a fuel inlet fitting for delivering fuel to at least one fuel conduit extending through the feed arm. A nozzle body depends from the feed arm and has at least one fuel circuit extending therethrough. The fuel circuit is configured and adapted to receive fuel from the feed arm and to issue fuel from an exit orifice of the nozzle body. Sensing means are provided adjacent to the at least one fuel circuit. The sensing means are configured and adapted to provide temperature feedback in order to control fuel flow in the at least one fuel circuit to maintain fuel temperature within a predetermined range.

3 Claims, 6 Drawing Sheets

OTHER PUBLICATIONS

United Kingdom Search Report for Application No. GB0919460.6, dated Feb. 11, 2010.

Supplemental Search Report for Application No. GB0919460.6, dated Feb. 15, 2011.

United Kingdom Examination Report for Application No. GB0919460.6, dated May 9, 2012.

* cited by examiner

THERMAL MANAGEMENT FOR FUEL INJECTORS

CROSS-REFERENCE TO RELATED APPLICATIONS

This patent application is a divisional of and claims the benefit of priority to U.S. patent application Ser. No. 12/268,511, filed Nov. 11, 2008, which is incorporated by reference herein in its entirety.

BACKGROUND OF THE INVENTION

1. Field of the Invention

The present invention relates to injectors and nozzles for high temperature applications, and more particularly, to fuel injectors and nozzles for gas turbine engines.

2. Description of Related Art

A variety of devices and methods are known in the art for injecting fuel into gas turbine engines. Of such devices, many are directed to injecting fuel into combustors of gas turbine engines under high temperature conditions while reducing or preventing carbon formation or coking within fuel passages.

It is well known that fuels typically used in gas turbine engines are susceptible to breaking down into their constituent components when exposed to high temperatures. For example, if wetted wall temperatures in fuel lines utilizing Jet A fuel are allowed to reach about 350° F., the fuel will begin to break down, which can lead to carbon formation within the fuel lines. This phenomenon is known as coking. Since coking can build up and constrict and eventually block fuel passages, and since coke may flake off resulting in a large foreign object which can then clog or plug sensitive portions of the fuel injector, considerable efforts have been made to protect fuel circuits in fuel injectors and nozzles from high temperatures within gas turbine engines.

Staged fuel injectors for gas turbine engines are well known in the art. They typically include a pilot fuel atomizer for use during engine ignition and low power operation and at least one main fuel atomizer for use during higher power operation in concert with the pilot fuel atomizer. One difficulty associated with operating a staged fuel injector is that when the pilot fuel circuit is operating alone during low power operation, stagnant fuel located within the main fuel circuit can be susceptible to coking due to the temperatures associated with the operating environment. This can degrade engine performance over time if the main fuel circuitry becomes constricted or blocked from coking, as described above.

High performance gas turbines often utilize circumferential or radial staging of fuel injectors to help limit emissions and maintain stability at part power conditions. Staging injectors circumferentially is sometimes referred to as selective fuel injection (described, for example in D. W. Bahr, Technology for the Design of High Temperature Rise Combustors, J. Propulsion, Vol. 3 No. 2, March-April 1987), which can be accomplished through injector to injector fuel control, staging within a multi-circuit injector, or some combination thereof. This technique can be used with piloted or non-piloted fuel injectors. As an example, at low throttle conditions only half or less of the injectors of a combustor may be used to actually issue fuel. Fuel within the remaining nozzles not issuing fuel to the combustor is susceptible to coking, just as stagnant circuits in staged fuel injectors described above. Coking can occur during selective fuel injection regardless of what type of fuel injectors are used.

In the past, attempts were made to extend injector life by passively insulating, active cooling, or otherwise protecting the fuel circuitry of fuel injectors from carbon formation during low power engine operation. Passive insulation often involves incorporation of heat shielding into injector design. Purging stagnant fuel from unused fuel circuits is another possible way of extending injector life, but this requires a pressure source, typically compressor discharge air ingested by the injector, to force stagnant fuel from the circuit. For staged fuel injectors, efforts have also been made to actively cool stagnant fuel using fuel flow from a pilot fuel circuit. This usually involves use of a second source such as a cool fuel line or cooled air flow to remove heat from stagnant fuel circuits. One such effort is disclosed in U.S. Pat. No. 5,570,580 to Mains, which provides a fuel injector having two dual orifice injector tips, each with a primary and secondary pressure atomizer. In this injector, fuel streams to the primary and secondary sprays of the pilot and main nozzle tips are arranged to transfer heat between the pilot primary fuel stream and each of the main secondary fuel stream and the pilot secondary fuel stream. However, in these active cooling techniques, the heat capacity of the cooling media and its proximity to the stagnant fuel circuit can limit the effectiveness of actively cooling the stagnant circuit.

U.S. Patent Application Publication No. 2007/0163263 to Thomson, incorporated by reference herein in its entirety, describes a staged airblast fuel injector designed for active cooling. Fuel passing through the pilot fuel circuit is routed through the injector to cool stagnant fuel within the main fuel circuit during low power engine operation. This configuration can reduce or prevent carbon formation or coking in the main fuel circuit of the injector.

Such conventional methods and systems generally have been considered satisfactory for their intended purpose. However, for staged airblast fuel injectors, pure airblast fuel injectors, and other injector types there is still a need for improved devices and methods for thermal management of fuel circuits during selective fuel injection. There is also a continued need in the art for systems and methods that allow for active cooling of any nozzle/injector type during low power conditions. The present invention provides a solution for these problems.

SUMMARY OF THE INVENTION

The subject invention is directed to a new and useful fuel injector for a gas turbine engine. The fuel injector includes a feed arm having a fuel inlet fitting for delivering fuel to at least one fuel conduit extending through the feed arm. A nozzle body extends from the feed arm and has at least one fuel circuit extending therethrough. The fuel circuit is configured and adapted to receive fuel from the feed arm and to issue fuel from an exit orifice of the nozzle body. Sensing means are provided adjacent to the at least one fuel circuit. The sensing means are configured and adapted to provide temperature feedback in order to control fuel flow in the at least one fuel circuit to maintain fuel temperature within a predetermined range.

In one embodiment, the nozzle body includes an inboard pilot fuel circuit, and a main fuel circuit outboard of the pilot fuel circuit, and the sensing means are adjacent to the main fuel circuit. The sensing means can be adjacent to a portion of the fuel circuit configured and adapted to experience highest peak wetted wall temperatures within the fuel circuit. It is also envisioned that the nozzle body can include a pure airblast nozzle having an on-axis inner air circuit inboard of the fuel circuit, and an outer air circuit outboard of the nozzle body.

A method is provided for managing temperatures of fuel in a fuel injector for a gas turbine engine. The method includes cooling a fuel circuit of a first fuel injector by initiating or increasing fuel flow through the fuel circuit for combustion in a combustor of the gas turbine engine in response to fuel temperature in the fuel circuit in excess of a first predetermined limit. The method further includes reducing fuel flow through the fuel circuit in response to fuel temperature in the fuel circuit below the first predetermined limit.

It is envisioned that the step of cooling can include initiating fuel flow using a predetermined relationship of fuel temperature as a function of time to determine whether fuel temperature exceeds the first predetermined limit. Moreover, the step of reducing fuel flow can include reducing fuel flow using a predetermined relationship of fuel temperature as a function of time to determine whether fuel temperature falls bellow a second predetermined limit.

In one embodiment, the step of cooling includes initiating fuel flow through the fuel circuit, wherein the step of reducing fuel flow includes stopping fuel flow through the fuel circuit. The step of reducing fuel flow through the fuel circuit of the first fuel injector can include reducing fuel flow in the first fuel injector in response to fuel temperature in the fuel circuit of the second fuel injector that is above the first predetermined limit.

In another embodiment, the step of cooling includes increasing fuel flow through the plurality of first injectors and reducing fuel flow through the plurality of second injectors, and the step of reducing fuel flow includes reducing flow in the plurality of first injectors and cooling fuel circuits of the plurality of second fuel injectors by increasing fuel flow therethrough. The steps of cooling and reducing flow can include using scheduling means to alternate between flowing fuel through the first injectors and the second injectors. The scheduling means can be actuated mechanically, hydro-mechanically, electromagnetically, piezoelectrically, or in any other suitable way.

The invention also includes a method of managing temperatures of fuel in a fuel injector for a gas turbine engine that includes use of sensor. The method includes determining fuel temperature in a fuel circuit of a first fuel injector using the sensor. The method also includes cooling the fuel circuit by initiating or increasing fuel flow through the fuel circuit for combustion in a combustor of the gas turbine engine in response to the sensor indicating fuel temperature in the fuel circuit that exceeds a first predetermined limit. A step is also included for reducing fuel flow through the fuel circuit of the first fuel injector in response to fuel temperature in the fuel circuit below the first predetermined limit.

In one aspect of the invention, the step of reducing fuel flow includes reducing fuel flow through the fuel circuit in response to the sensor indicating fuel temperature in the fuel circuit below a second predetermined limit. Further steps can include repeating the steps of determining fuel temperature in the fuel circuit, cooling the fuel circuit, and reducing fuel flow through the fuel circuit as needed to maintain fuel temperatures in the fuel circuit between the first and second predetermined limits. It is contemplated that the step of reducing fuel flow through the fuel circuit can include reducing flow through the fuel circuit in response to a predetermined amount of cooling time passing after the step of cooling has begun.

The step of reducing fuel flow through the fuel circuit can include reducing fuel flow through the fuel circuit of the first fuel injector in response to initiating fuel flow through a second fuel circuit in a second fuel injector operatively connected to the combustor of the gas turbine engine to cool the second fuel circuit. This can be accomplished while maintaining a substantially constant flow of fuel to the combustor. The step of reducing fuel flow through the fuel circuit of the first fuel injector can include reducing fuel flow in the first injector in response to fuel temperature in the fuel circuit of the second fuel injector that is above the first predetermined limit.

It is also envisioned that the step of reducing fuel flow through the fuel circuit of the first fuel injector can include reducing flow through the first fuel injector in response to a sensor of the second fuel injector indicating fuel temperatures in the second fuel injector above the first predetermined limit.

In certain embodiments of the method, the step of cooling includes increasing fuel flow through the plurality of first injectors in response to at least one sensor of the first injectors indicating fuel temperatures above the first predetermined limit and reducing flow through the plurality of second fuel injectors. The step of reducing flow includes reducing flow in the plurality of first injectors in response to a predetermined relationship of fuel temperature as a function of time indicating fuel temperatures in the second fuel injectors above the first predetermined limit and cooling the plurality of second injectors by increasing fuel flow therethrough.

These and other features of the devices and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the methods and devices of the subject invention without undue experimentation, preferred embodiments thereof will be described in detail herein below with reference to certain figures, wherein.

DETAILED DESCRIPTION OF THE PREFERRED EMBODIMENTS

Reference will now be made to the drawings wherein like reference numerals identify similar structural features or aspects of the subject invention. In accordance with the invention, a fuel injector for a gas turbine engine is provided, including a feed arm having a fuel inlet fitting for delivering fuel to at least one fuel conduit extending through the feed arm. A nozzle body depends from the feed arm and has at least one fuel circuit extending therethrough. The fuel circuit is configured and adapted to receive fuel from the feed arm and to issue fuel from an exit orifice of the nozzle body. Sensing means are provided adjacent to the at least one fuel circuit. The sensing means are configured and adapted to provide temperature feedback in order to control fuel flow in the at least one fuel circuit to maintain fuel temperature within a predetermined range.

Figure 1:
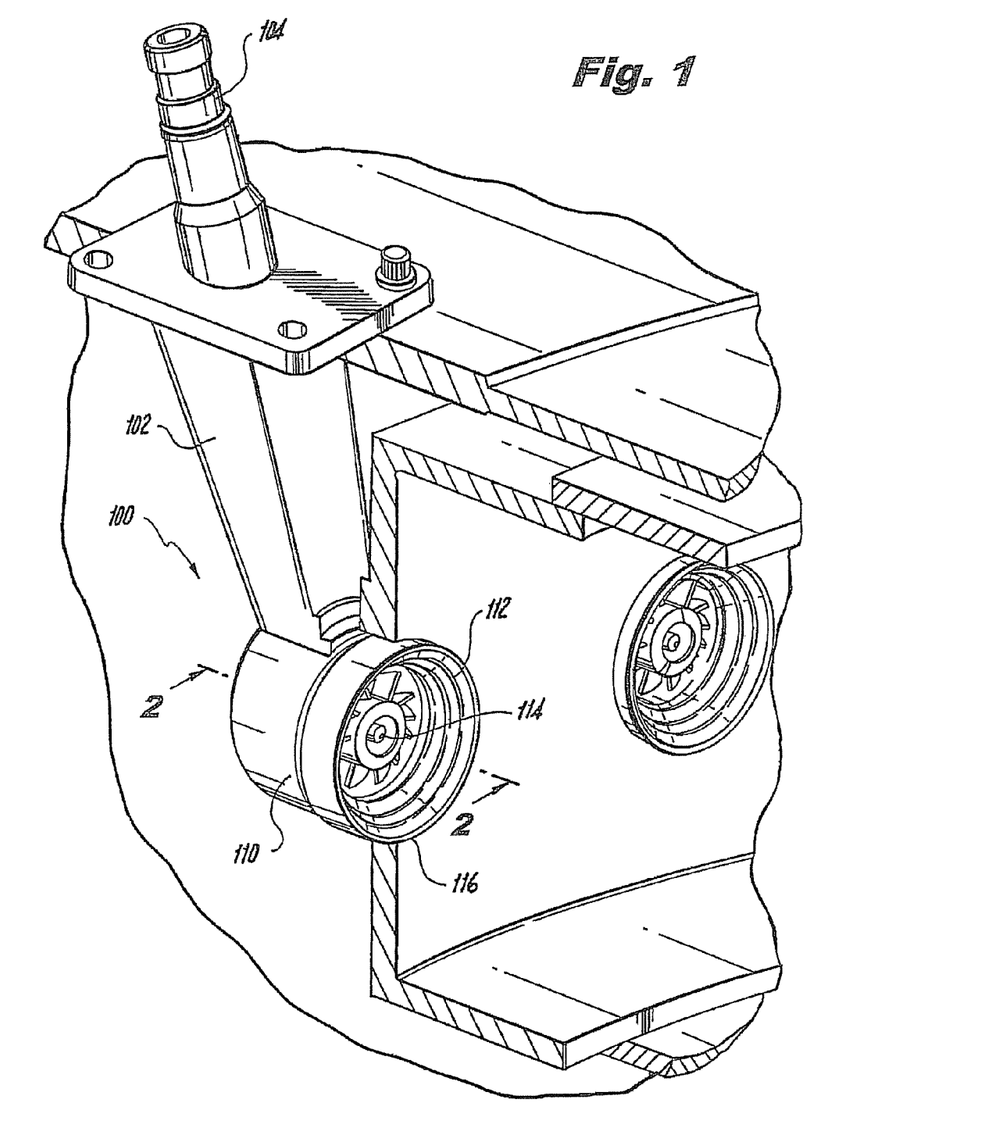
FIG. 1 is a perspective view of a fuel injector in accordance with the present invention, showing the injector within a partially cut-away combustor environment.

For purpose of explanation and illustration, and not limitation, a partial view of an exemplary embodiment of an injector in accordance with the invention is shown in FIG. 1 and is designated generally by reference character 100. Other embodiments of an injector in accordance with the invention, or aspects thereof, are provided in FIGS. 2-8b, as will be described. The system of the invention can be used in gas turbine engines, or in any other suitable application, for thermal management of fuel circuitry and reduction or prevention of coking in fuel nozzles and injectors.

Figure 2:
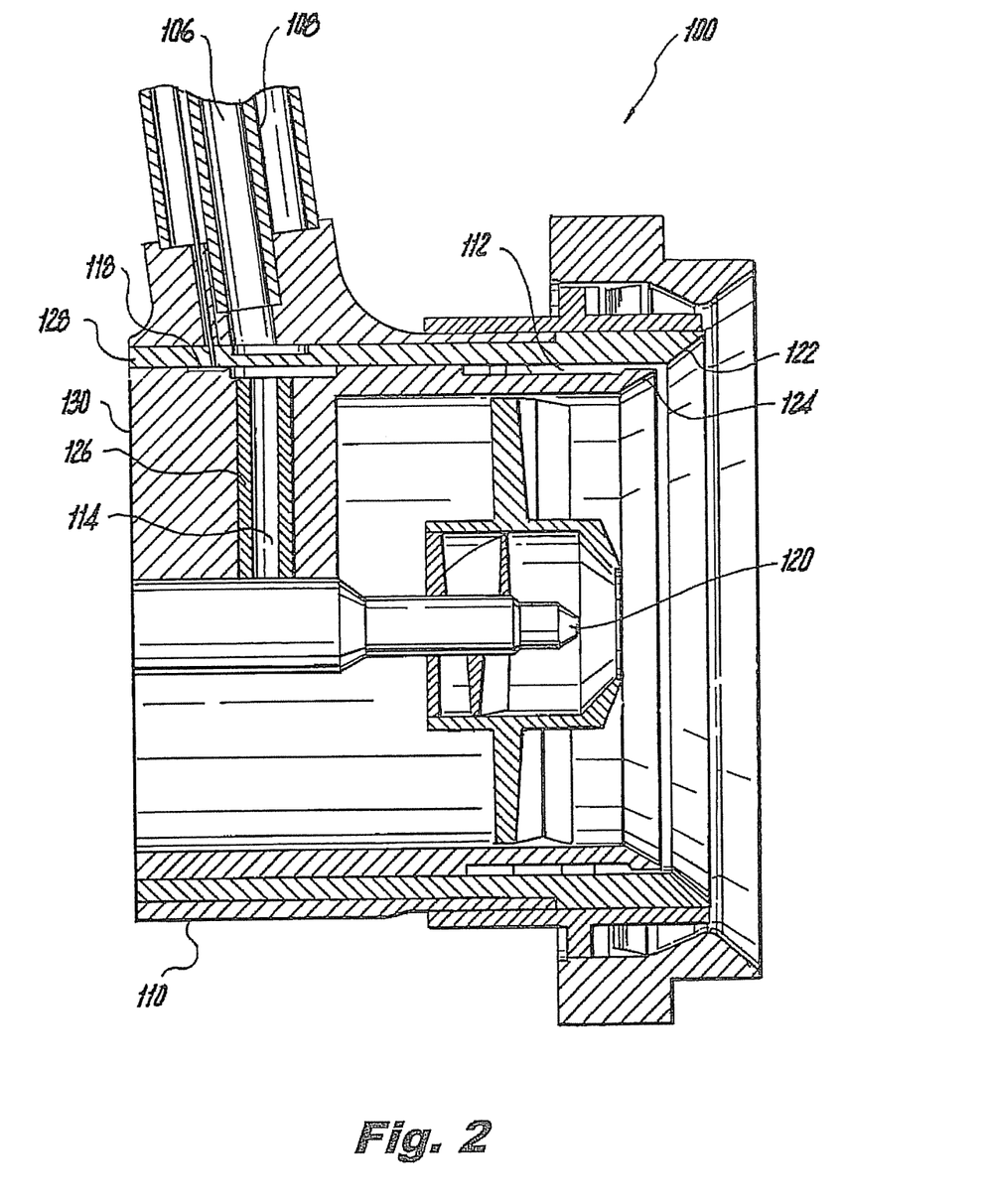
FIG. 2 is an enlarged cross-sectional side elevation view of a portion of the fuel injector of FIG. 1, showing fuel circuitry and sensing means within the nozzle body of the injector.

In accordance with the invention, fuel injector 100 includes a feed arm 102 having a fuel inlet fitting 104 for delivering fuel to a main fuel conduit 106 and pilot fuel conduit 108 (not shown in FIG. 1, but see FIG. 2) extending through feed arm 102. A nozzle body 110 depends from feed arm 102 and has a main fuel circuit 112 and pilot fuel circuit 114 extending therethrough. Fuel circuits 112/114 are configured and adapted to receive fuel from conduits 106/108 of feed arm 102 and to issue fuel from an exit orifice 116 of nozzle body 110. As shown in FIG. 2, sensing means 118 are provided adjacent to fuel circuits 112/114. Sensing means 118 are configured and adapted to provide temperature feedback in order to control fuel flow in the at least one fuel circuit to maintain fuel temperature within a predetermined range.

With continued reference to FIG. 2, nozzle body 110 includes a pilot atomizer 120 for receiving and atomizing fuel from pilot fuel conduit 108. Nozzle body 110 also includes a main atomizer 122 radially outboard of pilot atomizer 120 for receiving and atomizing fuel from main fuel conduit 106 of feed arm 102. Atomizer 122 is a pure airblast atomizer with inner and outer air swirlers surrounding a fuel swirler. However, fuel swirler 124 of main atomizer 122 includes fuel circuitry for both main and pilot fuel circuits 112/114. Fuel from main and pilot fuel conduits 106/108 passes into respective portions of main and pilot fuel circuits 112/114 of swirler 124. Main fuel is routed through swirler 124 to be sprayed from swirler 124 into swirling airflows for atomization. Pilot fuel is routed through swirler 124 to cool the main fuel circuit and exits through an inner fuel conduit 126, which supplies the pilot fuel to pilot atomizer 120 for atomization.

Figure 3:
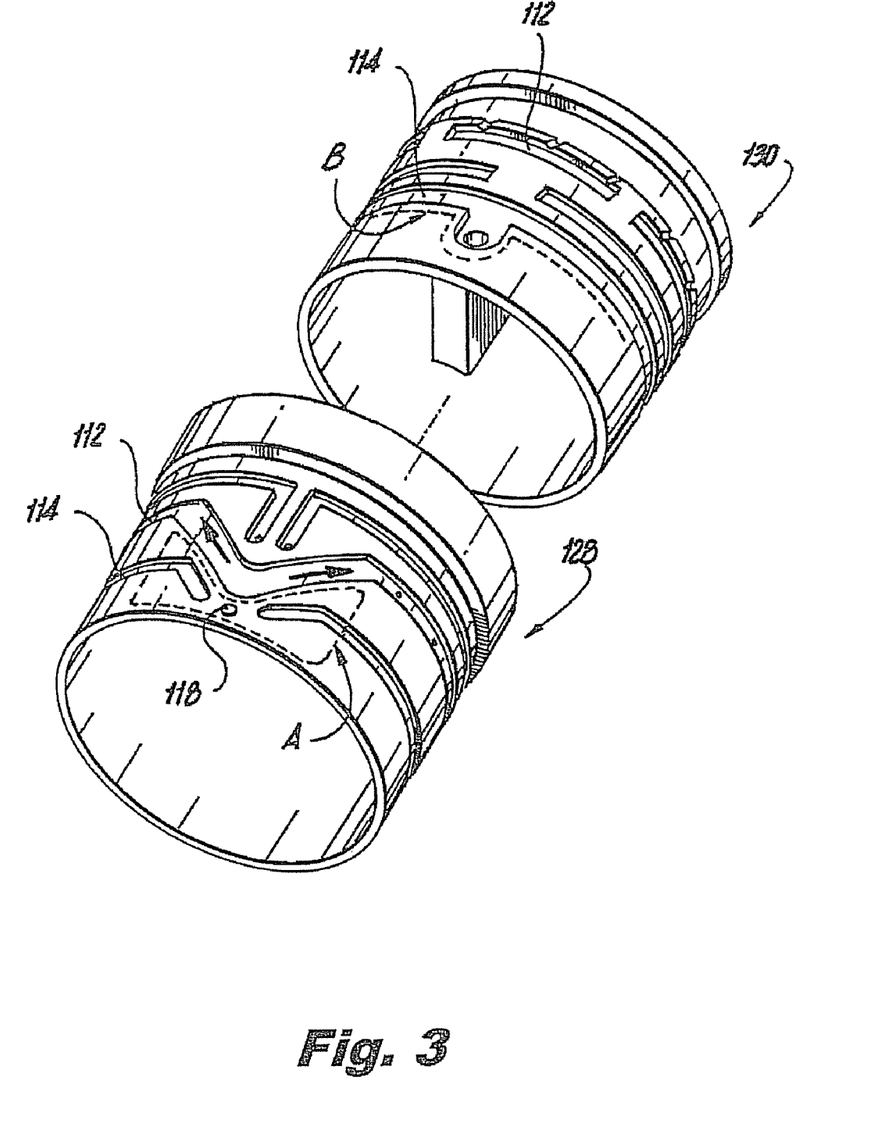
FIG. 3 is an exploded perspective view of inner and outer portions of main and pilot fuel circuits of the fuel injector of FIG. 1, showing high wetted wall temperature regions of the fuel circuits as viewed from above.
Figure 4:
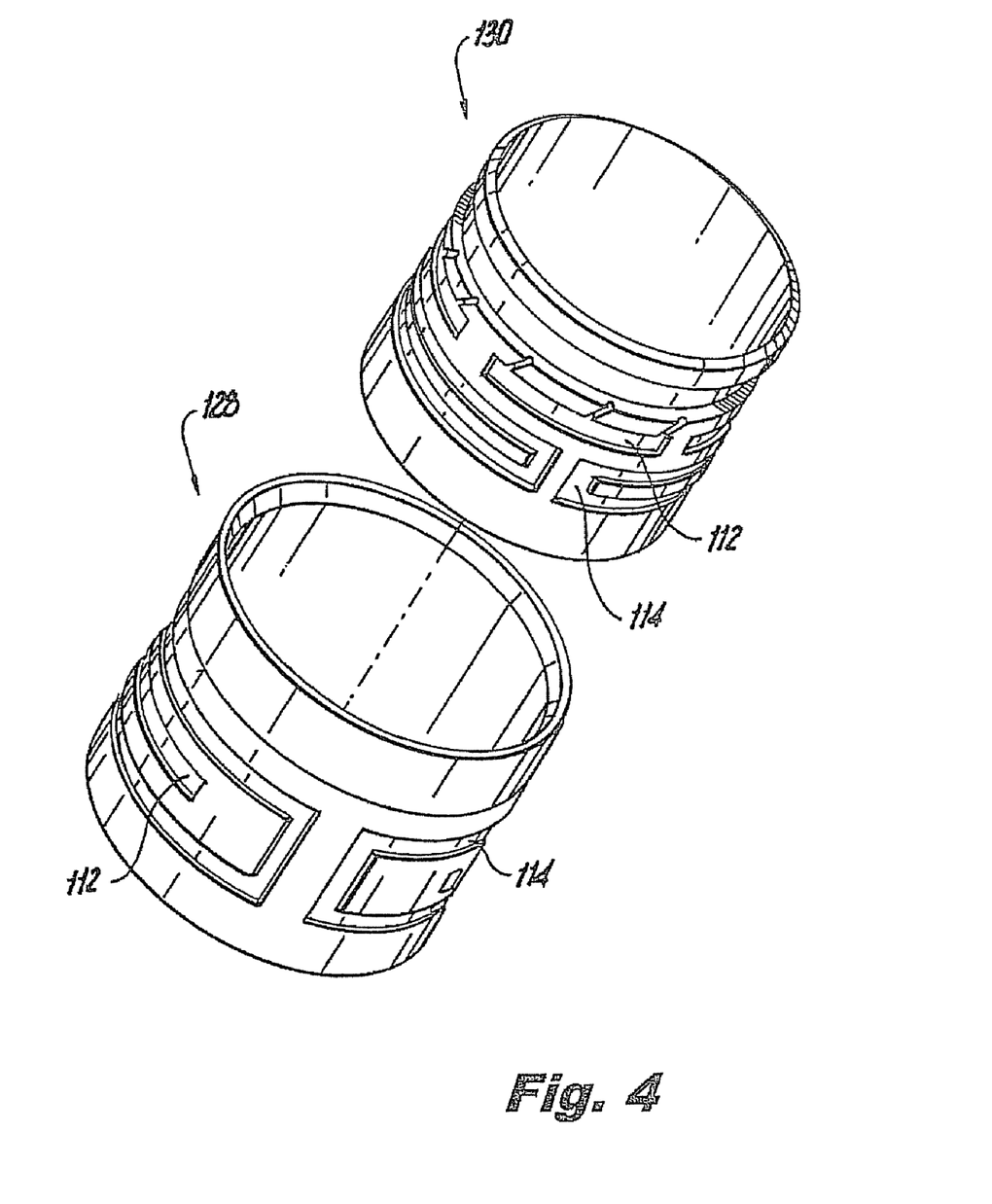
FIG. 4 is an exploded perspective view of inner and outer portions of main and pilot fuel circuits of the fuel injector of FIG. 1, showing inner and outer portions of main and pilot fuel circuits as viewed from below.

Swirler 124 includes an upper (outer) cylinder 128, or prefilmer, and a lower (inner) cylinder 130 radially inside upper cylinder 128. FIGS. 3 and 4 show the fuel circuit patterns of upper cylinder 128 and lower cylinder 130 to show the portions of main and pilot fuel circuits 112/114 within swirler 124. Sensor 118 is embedded in upper cylinder 128 in close proximity to main fuel circuit 112. When assembled, sensor 118 can be embedded between upper and lower cylinders 128/130, as shown in FIG. 2. However, the shown location for sensor 118 is only one of several suitable locations, as determined by modeling. Area A, indicated by broken lines in FIG. 3, shows portions of main fuel circuit 112 and pilot fuel circuit 114 that typically experience high wetted wall temperatures. Area B, indicated by the broken line in FIG. 3, shows portions of pilot fuel circuit 114 that typically experience high wetted wall temperatures. It is not necessary for sensor 118 to extend into the fuel circuit or be flush with the wall of the fuel circuit. Rather, sensors can be located at any suitable location in good thermal contact with one or both fuel circuits 112/114, including locations within areas A and B. Ideally, sensors are located adjacent a location where wetted wall temperatures are highest, or where coking temperatures are likely to occur first. If sensor 118 is spaced apart from the wall of a fuel circuit 112/114, it is still possible to infer the wetted wall temperature based on readings from sensor 118 using a simple calibration or other similar technique.

While injector 100 has been described above as a staged pure airblast nozzle with main and pilot atomizers, those skilled in the art will readily appreciate that an airblast nozzle having an on-axis inner air circuit inboard of the fuel circuits, and an outer air circuit outboard of the nozzle body can also be used. Moreover the injector can be simplex, duplex, dual orifice, piloted air blast, pure air blast, dual pure airblast, discrete jet, or any other suitable type and can include any number of swirlers including multiple air circuits for each passage, single air circuits, multiple single air circuits, etc., without departing from the spirit and scope of the invention. While certain locations have been shown for injector 100, those skilled in the art will readily appreciate how to model or test a particular injector design to determine ideal locations of sensing means for other nozzle or injector configurations.

Sensor 118 should be selected for a given injector design based on responsiveness and ability to withstand the environment of a gas turbine engine. Sensor 118 is configured to withstand thermal and chemical aspects of the engine environment, as well as the vibration typical within the injector environment. Suitable sensor types for sensor 118 include thermocouples, thermopiles, thermistors, optical fiber thermometry sensors, sensors incorporating bimetallic elements, MEMS (Micro-electromechanical Systems) temperature sensors, or any other suitable sensor type or combination of sensors. Sensors and any leads, if applicable, should be shielded if necessary. One exemplary sensor includes a J- or K-type thermocouple with a sheath made of a heat and corrosion resistant material. Any number of individual sensors can be included at various locations. Those skilled in the art will readily appreciate how to select proper sensor types for sensors 118 given a particular injector type and application.

Sensor 118 can be used to provide feedback for a control system for thermal management of fuel circuits in accordance with one method of the invention. The method can be used on a first fuel injector (e.g. injector 100) including a feed arm (e.g. feed arm 102) having a fuel inlet fitting (e.g. inlet fitting 104) and a fuel conduit (e.g. conduits 106/108) in fluid communication with the inlet fitting, a nozzle body (e.g. nozzle body 110) depending from the feed arm having a fuel outlet in fluid communication with the fuel conduit to form a fuel circuit (e.g. fuel circuits 112/114), and sensing means (e.g. sensor 118) adjacent the fuel circuit. The method includes determining fuel temperature in the fuel circuit using the sensing means and cooling the fuel circuit by initiating or increasing fuel flow through the fuel circuit for reaction in a combustor of the gas turbine engine in response to the sensing means indicating fuel temperature in the fuel circuit that exceeds a first predetermined limit. The method further includes reducing fuel flow through the fuel circuit of the first fuel injector in response to fuel temperature in the fuel circuit below the first predetermined limit. This method involves a closed control loop, utilizing temperature feedback from sensing means to thermally manage fuel circuits in any suitable type of injector.

Figure 5:
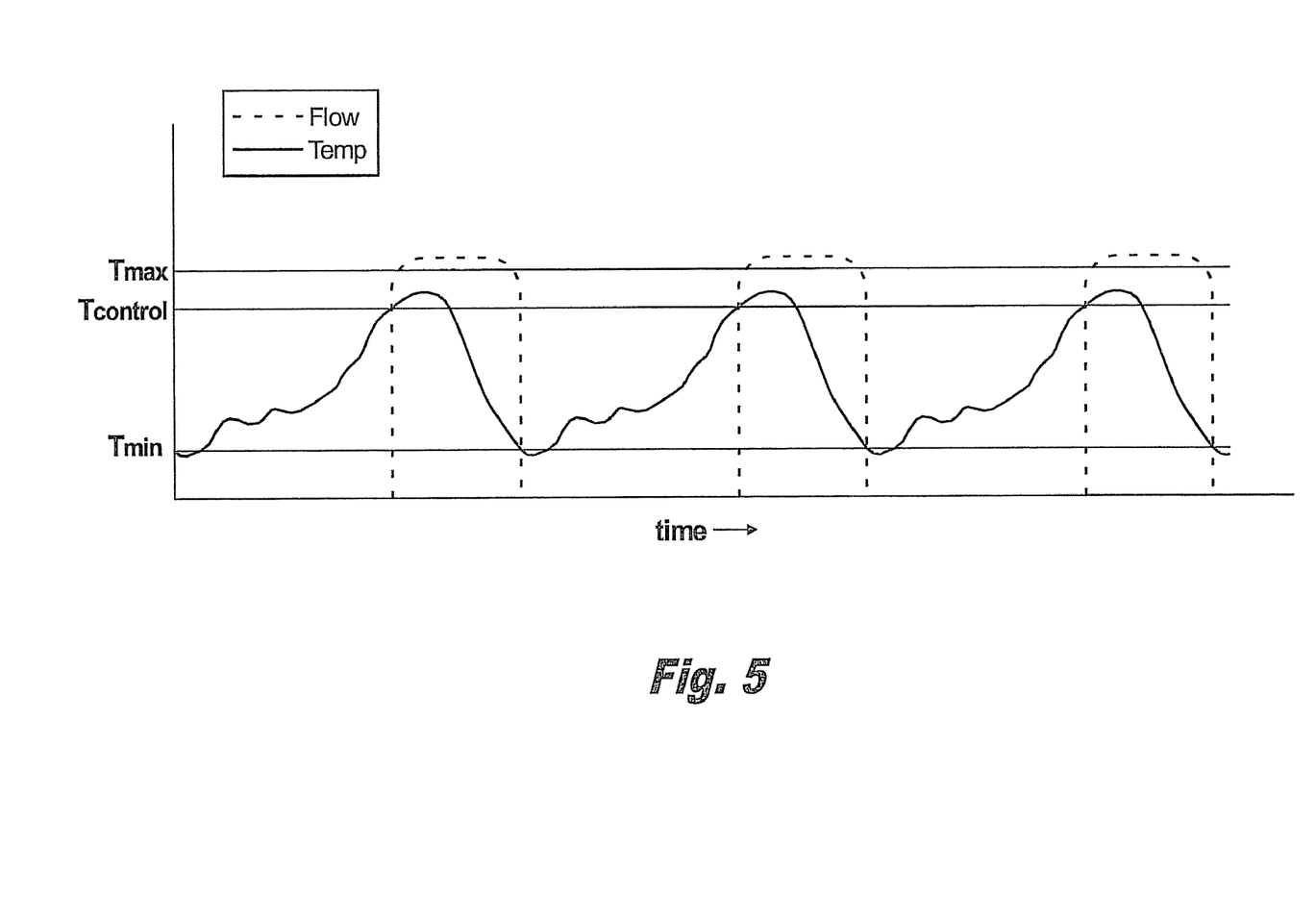
FIG. 5 is a plot of temperature and flow rate for a fuel injector in accordance with the present invention, showing a cycle of flow rate and temperature over time.

FIG. 5 shows a plot of wetted wall temperature and fuel flow rate over time for a fuel circuit. As shown in FIG. 5, when there is no fuel flow through a fuel circuit of an injector, the temperature of the stagnant fuel rises over time. Sensing means can be used to monitor this rise in temperature. When temperatures approach a predetermined threshold ($T_{Max}$) flow is initiated or increased through the fuel circuit. This can be accomplished by diverting fuel flow from one or more other circuits that are relatively cool for a staged operating condition as described below. The predetermined threshold ($T_{Max}$) can be the onset temperature for coking, or can be above or below the onset temperature for coking to provide an adequate margin and/or account for calibrating the sensing means to peak wetted wall temperature (e.g., $T_{Control}$). $T_{Max}$ is dependant upon the fuel being used. For Jet-A fuel a typical $T_{Max}$ is around 350° F., for newer military jet fuels this value would be higher, for ground based gas turbines which utilize diesel or bio diesel this value would be much lower. The fuel flow through a circuit lowers wetted wall temperatures thereof. Fuel flow through the circuit can be terminated or reduced when wetted wall temperatures in the fuel circuit are cooled sufficiently. For example, fuel flow can be terminated in response to the sensing means indicating fuel temperature in the fuel circuit below a second predetermined limit ($T_{Min}$). $T_{Min}$ is dependant on the actual temperature of the fuel coming into the fuel injector and varies depending on the manufacturer of the gas turbine and its use (i.e. ground based, commercial aircraft, military fighter, etc.). $T_{Min}$ is also determined by the control system since $T_{Min}$, may be set by continuously flowing fluid through the cooling circuit or may be set by turning fuel flow on and off. $T_{Min}$ thus also depends on the level of complexity of the control system being used. The control steps described above can be repeated as needed to maintain fuel temperatures in the fuel circuit between the first and second predetermined limits, resulting in the temperature and flow cycles shown in FIG. 5, which shows three such cycles.

In order to maintain a steady or controlled power level for the engine, it is desirable to maintain a substantially constant or controlled overall fuel flow rate in the engine, in order to avoid unstable fuel split conditions. Average fuel flow to the combustor should remain as controlled, for example, by a Full Authority Digital Engine Control ("FADEC"), when fuel flows are diverted for thermal management. Therefore, when a fuel circuit is deactivated or has its flow decreased, the flow (or portion of the flow) from that fuel circuit must be diverted to at least one other fuel circuit in the engine. The other fuel circuit can be a second fuel circuit in the same injector in the case of multi-stage injectors, or can be one or more fuel circuits in one or more other fuel injectors. FIG. 5 shows the flow over time for a single fuel circuit. During the periods shown on FIG. 5 where the fuel circuit has no flow, the flow must be diverted elsewhere to maintain a steady overall fuel flow rate. There are various possible schemes for maintaining a constant overall fuel flow rate, of which the following are exemplary. Those skilled in the art will readily appreciate how to test transient steps switching between stages for specific injector and combustor designs to avoid instability or "rumble" using test stand procedures or similar methods.

If a closed loop method is used for managing wetted wall temperatures in a multi-circuit injector, a second fuel circuit can alternate with the first fuel circuit, flowing when the first fuel circuit is stagnant, and being stagnant when the first circuit is flowing. One way of triggering the step of reducing flow to the first fuel circuit (plotted in FIG. 5) is diverting flow from the first to the second circuit when the sensing means of the first circuit detects a wetted wall temperature at or below $T_{Min}$. In this method, the second fuel circuit (where flow is diverted from the first fuel circuit) does not require sensing means. However, there is a tradeoff since by this technique it may be possible to reach coking temperatures in the second circuit while the first fuel circuit is flowing—without any sensing means, there is no way to detect and prevent this. Rather, the control timing can be developed for particular applications so that the temperature and flow cycles of the first and second circuits have well correlated periods, and so that any deviation results in acceptable amounts of coking.

A second technique is possible wherein sensing means are included in the second fuel circuit, be it part of the same injector as the first fuel circuit, or in a separate injector. The sensing means of the second fuel circuit can be used to trigger diversion of fuel flow from the first fuel circuit to the second fuel circuit when wetted wall temperatures in the second fuel circuit approach the predetermined temperature $T_{Max}$, regardless of the temperature to which the first circuit has cooled. This way neither circuit can reach coking temperatures since fuel flow is diverted in to cool either circuit when either circuit approaches $T_{Max}$.

A third possibility is to reduce fuel flow through the first fuel circuit and divert the flow to a second fuel circuit in response to a predetermined amount of cooling time passing after flow is initiated through the first fuel circuit. This third method does not require sensing means for the second fuel circuit, and if the predetermined amount of time is calculated to lapse before the onset of coking in the second fuel circuit, then the third method will allow for constant fuel flow rates while preventing coking. Thus by this technique, the sensing means of the first fuel circuit are only needed for detecting $T_{Max}$, and not $T_{Min}$, and the control system is therefore semi-open.

Figure 6:
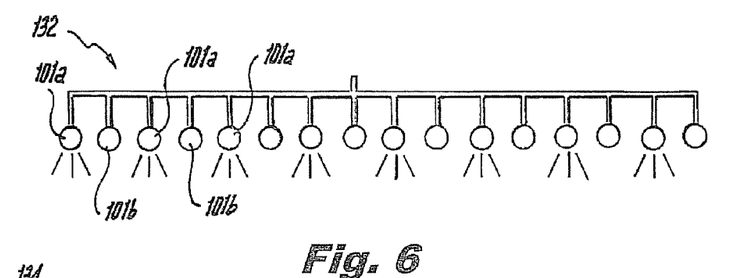
FIG. 6 is a schematic view of a system of single circuit fuel injectors in accordance with the present invention, showing a pattern of circumferential fuel staging.

Another aspect of the closed-loop thermal management methods involves staging all of the fuel injectors of a combustor. FIG. 6 shows a schematic view showing an exemplary way of staging fuel flow in a combustor system 132. As shown in FIG. 6, fuel can be supplied to combustor system 132 from a first half of the injectors 101a while the second half of the injectors 101b is inactive. FIG. 6 shows a pattern in which at any one moment every other fuel injector is stagnant and every other fuel injector is active. When the stagnant half of the injectors 101b have wetted wall temperatures approaching the coking limit, the flow of fuel can be diverted from the first half of the injectors 101a to cool the second half of the injectors 101b.

It is not necessary for the injectors to all have to be on the same cycle. For example, the injectors could be grouped in pairs (or small groups) that alternate with each other within each pair or group. Each pair or group could be out of sync with the other injector pairs or groups of the system. This would assure that injector pairs or groups could switch more frequently if they are receiving more heat, but the fuel flow rate would still remain relatively constant. The ability to operate the fuel injector cooling scheme in pairs, or small groups of injectors can be determined by engine manufacturers based on overall operation of the combustor for specific applications.

It is also not necessary for a given fuel circuit to be completely on or off. The staging can also be accomplished through simply increasing or decreasing flow wherein alternating fuel circuits are both active and flowing but at different rates that vary to control temperature as needed. As long as the overall flow into the combustor remains constant or controlled, any suitable arrangement can be used for increasing fuel to some fuel circuits while decreasing fuel flow in other fuel circuits to control fuel temperature while maintaining controlled overall fuel flow to the combustor.

The timing for diverting the flows can be determined by one or more sensing means among the first half of the fuel injectors 101a detecting a wetted wall temperature below a $T_{Min}$, one or more sensing means among the second half of the fuel injectors 101b detecting a wetted wall temperature approaching $T_{Max}$, or when a predetermined amount of time has passed since flow was initiated in the first half of injectors 101a, as described in the techniques above. By these techniques, it is possible to stage all of the injectors based on feedback from a single sensing means in a single injector. However, it is also possible for each fuel circuit to have its own sensing means, wherein the staging occurs when any one sensing means detects $T_{Max}$.

Those skilled in the art will readily appreciate that the staging fuel flow through only every other injector, with half of the injectors stagnant at a time, is exemplary only and that any number of injector groups can be used for staging in any suitable circumferential staging pattern without departing from the spirit and scope of the invention. For example, if every fuel circuit has sensing means, if one of the sensing means detects critical wetted wall temperatures, flow can be diverted to another fuel circuit whose sensing means indicate a fully cooled wetted wall temperature, without affecting the other injectors. This can also be done with injectors operating in groups, where only one fuel circuit in the group has sensing means. Whatever scheme is used, care should be taken to ensure that each section of the combustor has an adequate supply of fuel so as to avoid complications from unstable operating zones or cold zones where several injectors in a row are stagnant, for example. This can be verified using full annular test stand procedures.

Figure 7:
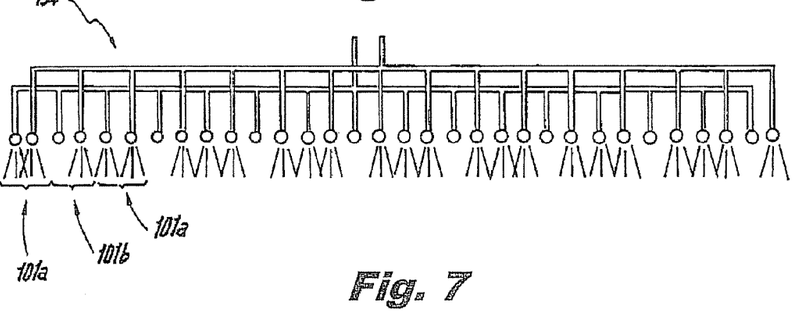
FIG. 7 is a schematic view of a system of multi-circuit injectors in accordance with the present invention, showing a pattern of circumferential staging.

FIG. 7. shows a schematic view of a staging pattern in which dual-stage injectors (e.g. injector 100) are used in a combustor system 134. This pattern is similar to the pattern described above with respect to FIG. 6, and can be varied as described above. The difference compared to the pattern shown in FIG. 6 is that since each injector includes two fuel circuits (e.g. pilot and main fuel circuits), and for each injector a first circuit is always active and it is only the second circuits that are staged between a first half of the injectors 101a and a second half of the injectors 101b. Of course, additional stages could be included in which both circuits of some injectors can be inactive. Those skilled in the art will readily appreciate that any number of stages and fuel circuits per injector can be used without departing from the spirit and scope of the invention.

Figure 8A:
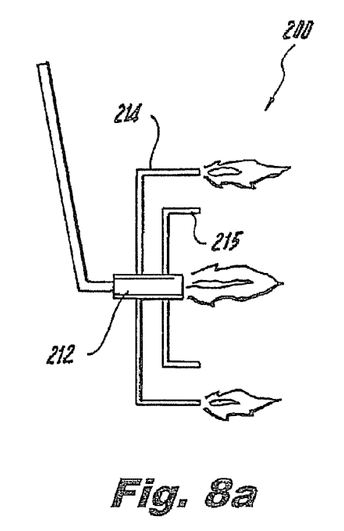
FIG. 8a is a schematic view of a multi-circuit injector in accordance with the present invention, showing a first stage of an internal staging pattern.
Figure 8B:
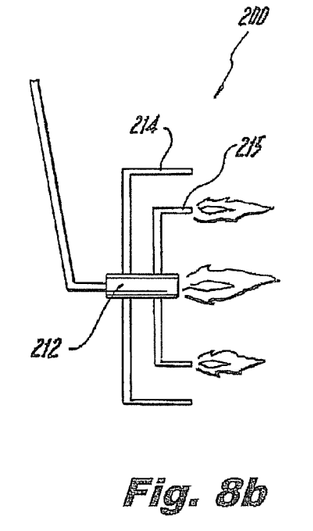
FIG. 8b is a schematic view of a multi-circuit injector in accordance with the present invention, showing a second stage of an internal staging pattern.

FIGS. 8a and 8b show a schematic view of an injector 200 configured for thermal management on an individual injector basis. Injector 200 includes a pilot fuel circuit 212, a first main fuel circuit 214, and second main fuel circuit 215. In a first stage shown in FIG. 8a, fuel flows from both pilot circuit 212 and first main circuit 214, while second main circuit 215 is stagnant. When wetted wall temperatures in second main circuit 215 approach the coking limit, the flow of first main circuit 214 is diverted to second main circuit 215, which is the second stage, as shown in FIG. 8b. As described above, the staging can be triggered using one or more sensing means in main fuel circuits 214/215. Injector 200 allows for each injector of a combustor to stage internally as needed, regardless of the state of the other injectors. Those skilled in the art will readily appreciate that additional stages can divert flow to and from pilot circuit 212, and that any number of additional fuel circuits can be included and staged without departing from the spirit and scope of the invention.

Various methods are also provided for managing temperatures of fuel in a fuel injector for a gas turbine engine using an open control system. These methods can utilize a first fuel injector as described above, but without sensing means. The injector can be of any suitable type, as described above. The methods includes cooling the fuel circuit by initiating fuel flow through the fuel circuit for combustion in a combustor of the gas turbine engine in response to fuel temperature in the fuel circuit in excess of a first predetermined limit. The methods further include reducing fuel flow through the fuel circuit in response to fuel temperature in the fuel circuit below the first predetermined limit.

Since in the open loop methods, there is no sensing means used for determining when wetted wall temperatures are approaching the coking limit, it is envisioned that the step of cooling can include initiating fuel flow using a predetermined relationship of fuel temperature as a function of time to determine whether fuel temperature exceeds the first predetermined limit. Moreover, the step of reducing fuel flow can similarly include reducing fuel flow using a predetermined relationship of fuel temperature as a function of time to determine whether fuel temperature falls bellow a second predetermined limit, or when a predetermined amount of time has passed for a second circuit to approach the first predetermined limit. The temperature time functions can be a simple set period of time, or can be made more complex to take into account engine operating conditions. In short, any suitable function of temperature over time can be used, and those skilled in the art will readily appreciate how to determine such functions through testing, predictive analysis and/or modeling. The open loop methods can be used to control any number of injectors around a combustor in any suitable circumferential pattern, as described above with respect to the closed loop methods.

In any of the methods described above, the steps of cooling and reducing flow can include using scheduling means to alternate between flowing fuel through the first fuel injectors and the second fuel injectors. Exemplary scheduling means can operate mechanically, hydro-mechanically, electromagnetically, piezo-mechanically, or any other suitable way. Scheduling means can be incorporated into an injector, or can be separate but operably connected to control fuel flowing through the injector.

If the scheduling means are actuated mechanically, several injectors can be scheduled using a mechanical means in contact with valves that activate and deactivate the fuel circuits of the injectors. The mechanical means can be a unison ring, cable driven, servo driven, hydraulic, or pneumatic, for example. Mechanical scheduling is best suited for applications where predetermined flow conditions are known or where each valve has a discrete schedule. However, mechanical scheduling can be used with a closed loop or semi closed loop control system as well. It is also possible for each injector valve to have an individual mechanical actuator.

Hydro-mechanical scheduling utilizes a single control manifold, or a separate manifold for each individual injector or group of injectors. The manifold or manifolds can be used to facilitate positioning of injector valves based on pressure control in the manifold or manifolds. Injector valves can be ported to allow for desired flow splits, meaning the flows through multiple fuel circuits. If the total fuel flow in all of the circuits is 100%, then each circuit may accommodate a percentage of that fuel (for example if 30% of the fuel flow is through a pilot circuit and 70% is through a main circuit).

Electromagnetic scheduling includes use of electromechanical valves operatively connected to control the injectors. Solenoid type electromagnetic actuators can be used for simple open-closed toggling of valves. For variable and intermediate valve positions, variable position actuators can be used. It is also contemplated that electromechanical valves can be used in conjunction with hydro-mechanical valves, so that if there is a failure of one system, there is still an ability to produce engine power albeit with reduced operability.

Piezoelectric scheduling can be utilized to impart a distinct valve position based on a voltage. Crystal movement can be harnessed into linear motion to move or toggle the valve. If necessary, several crystals can be stacked to achieve a desired range of motion. This approach is conducive to scheduling on an individual injector basis, but can also be used with multiple injectors in unison. Regardless of what type of scheduling means are used to operate the injectors, those skilled in the art will readily appreciate how to adapt closed, open, or semi-open control methods with a given scheduling means. Moreover, the scheduling means described herein are exemplary only, and any suitable scheduling means can be used without departing from the spirit and scope of the invention.

The methods and systems of the present invention, as described above and shown in the drawings, provide for thermal management of stagnant fuel circuits of injectors in gas turbine engines with superior properties including reduction or elimination of thermally induced coking. This improved thermal management allows for extended injector life when engines utilize staging during low power operation to improved emissions and operability.

While the apparatus and methods of subject invention have been shown and described with reference to preferred embodiments, those skilled in the art will readily appreciate that changes and/or modifications may be made thereto without departing from the spirit and scope of the subject invention.

What is claimed is:

1. A fuel injector for a gas turbine engine comprising:
 a) a feed arm having a fuel inlet fitting for delivering fuel to at least one fuel conduit extending through the feed arm;
 b) a nozzle body depending from the feed arm having a pilot fuel circuit and a main fuel circuit outboard of the pilot circuit extending therethrough, wherein the pilot fuel circuit and the main fuel circuit are configured and adapted to receive fuel from the feed arm and to issue fuel from an exit orifice of the nozzle body; and
 c) sensing means configured and adapted to provide temperature feedback in order to control fuel flow in at least one of the main and pilot fuel circuits to maintain fuel temperature within a predetermined range, wherein the sensing means are in a swirler housing of the nozzle body adjacent to at least one of the main and pilot fuel circuits for sensing fuel temperature.

2. A fuel injector as recited in claim 1, wherein the sensing means are adjacent a portion of the at least one of the main and pilot fuel circuits configured and adapted to experience highest peak wetted wall temperatures within the fuel circuit.

3. A fuel injector as recited in claim 1, wherein the nozzle body includes a pure airblast nozzle having an on-axis inner air circuit inboard of the fuel circuit, and an outer air circuit outboard of the nozzle body.

* * * * *